United States Patent
Iijima et al.

(10) Patent No.: US 8,926,729 B2
(45) Date of Patent: Jan. 6, 2015

(54) METHOD AND APPARATUS FOR DIRECT REDUCTION IRONMAKING

(75) Inventors: Masaki Iijima, Tokyo (JP); Haruhito Watanabe, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 207 days.

(21) Appl. No.: 13/167,216

(22) Filed: Jun. 23, 2011

(65) Prior Publication Data

US 2011/0314966 A1 Dec. 29, 2011

(30) Foreign Application Priority Data

Jun. 25, 2010 (JP) ................ 2010-144724

(51) Int. Cl.
C22B 1/00 (2006.01)
C21C 5/40 (2006.01)
C21B 5/06 (2006.01)
F27B 1/00 (2006.01)
F27D 17/00 (2006.01)

(52) U.S. Cl.
CPC . C21B 5/06 (2013.01); F27B 1/005 (2013.01); F27D 17/004 (2013.01); C21B 2100/02 (2013.01); C21C 2100/02 (2013.01)
USPC .......... 75/489; 75/496; 75/498; 266/155; 266/156; 266/197

(58) Field of Classification Search
USPC .......... 75/489, 496, 498; 266/155, 156, 197
See application file for complete search history.

(56) References Cited

U.S. PATENT DOCUMENTS

| | | | | |
|---|---|---|---|---|
| 2,547,685 A * | 4/1951 | Brassert et al. | ........... | 75/498 |
| 3,748,120 A * | 7/1973 | Beggs et al. | ........... | 75/496 |
| 4,001,010 A * | 1/1977 | Kanbara et al. | ........... | 75/496 |
| 6,395,056 B1 * | 5/2002 | Villarreal-Trevino et al. | . | 75/496 |
| 6,818,198 B2 * | 11/2004 | Singh et al. | ........... | 423/652 |
| 6,981,994 B2 * | 1/2006 | Drnevich et al. | ........... | 48/198.7 |
| 8,377,417 B2 * | 2/2013 | Metius et al. | ........... | 423/650 |

FOREIGN PATENT DOCUMENTS

| | | |
|---|---|---|
| EA | 008048 B1 | 2/2007 |
| JP | 7-005951 B2 | 1/1995 |
| RU | 2 266 252 C2 | 12/2005 |
| WO | 2005/098052 A1 | 10/2005 |

OTHER PUBLICATIONS

Machine translation of CN 101307371 A published Nov. 19, 2008.*
Derwent ACC No. 2009-B51713 for patent family including CN 101307371 A by Chen et al. Published Nov. 19, 2008.*

(Continued)

*Primary Examiner* — George Wyszomierski
*Assistant Examiner* — Tima M McGuthry Banks
(74) *Attorney, Agent, or Firm* — Westerman, Hattori, Daniels & Adrian, LLP

(57) ABSTRACT

An apparatus for producing a reducing gas for direct reduction iron-making includes an internal-heating type reformer for reforming a natural gas by adding steam and oxygen to the natural gas and by partially burning the natural gas to generate reducing gas containing hydrogen and carbon monoxide; a remover for removing carbon dioxide from exhaust gas generated in the direct reduction iron-making; and a line for recycling as the reducing gas the exhaust gas from which the carbon dioxide is removed by the remover.

2 Claims, 2 Drawing Sheets

(56) References Cited

OTHER PUBLICATIONS

Russian Office Action dated Sep. 13, 2012, issued in corresponding Russian Patent Application No. 2011126240, with English translation (7 pages).
Y. Inada, "Improvements in the MIDREX (R) Direct Reduction Process", R & D Kobe Steel Engineering Reports, 2000, vol. 50, No. 3, pp. 86-89.
Russian Office Action dated Mar. 7, 2013, issued in coresppondding Russian Patent Application No. 2011126240, English translation (6 pages).
Stolyarevsky A. Ya. Technology of producing a synthetic gas for hydrogen energetics. International Scientific Journal "Alternative Energetics and Ecology", No. 2(22), p. 27, 2 column, lines 20-27. (Cited in Russian Office Action dated Mar. 7, 2013).
Technology of producing hydrogen, Uhde. The company of the "ThyssenKrupp Technologies" group. Aug. 2007, p. 17. (Cited in Russian Office Action dated Mar. 7, 2013).
Makarshin L. L. et al., "Microchannel catalyst systems for hydrogen energetics", The Journal of the Russian Chemical Society named after D.I. Mendeleyev, 2006, v. L, No. 6, p. 20, col. 1, lines 18-42. (Cited in Russian Office Action dated Mar. 7, 2013).
Mexican Office Action dated Mar. 25, 2014, issued in corresponding Mexican application No. MX/a/2011/006868 with partial English translation (5 pages).
Russian Notice of Allowance dated Apr. 23, 2014, issued in corresponding Russian Patent Application No. 2011126240, w/English translation (12 pages).
Kurunov et al., "Current state and trends of the direct metallurgy of iron", Moscow: Chermetinformatsiya, (2002) pp. 51-60, cited in Russian Notice of Allowance dated Apr. 23, 2014, issued in corresponding Russian Patent Application No. 2011126240.

\* cited by examiner

METHOD AND APPARATUS FOR DIRECT REDUCTION IRONMAKING

CROSS-REFERENCE TO RELATED APPLICATION

This application claims priority from Japanese Patent Application No. 2010-144724 filed Jun. 25, 2010, which is incorporated herein by reference in its entirety.

BACKGROUND OF THE INVENTION

The present invention relates to a method or apparatus for producing direct reduced iron and a method or apparatus for producing a reducing gas therefor.

As a method for producing metal iron by reducing iron ore, the direct reduction process and the blast furnace iron-making process are known. In the direct reduction process, metal iron typically is produced by reducing iron ore in solid phase using a reducing gas containing hydrogen and carbon monoxide which is obtained by reforming a natural gas (refer to Japanese Examined Patent Publication No. 7-5951, and Yutaka Inada, "Improvements in the MIDREX® Direct Reduction Process," R&D Kobe Steel Engineering Reports, Oct. 2000, Vol. 50, No. 3, pp. 86-89).

Methane, which is the main component of natural gas, is converted into hydrogen and carbon monoxide by steam reforming using an external-heating type reformer. Waste heat generated in the external-heating type reformer is reutilized in the reformer, e.g., for preheating the natural gas, for generating steam, and for preheating burning air.

SUMMARY OF THE INVENTION

The waste heat generated in the external-heating type reformer is, as discussed above, reutilized in the natural gas reforming process. However, there is a problem that most of the waste heat is discharged without any reutilization, whereas only some of the heat is reutilized in the reforming process. The waste heat of the reformer cannot be reutilized in the direct reduction iron-making process, because extra heat exists even in the direct reduction iron-making process.

Accordingly, in view of the above-described problem, an object of the present invention is to provide: a direct reduction iron-making process enabling most of the waste heat generated in the natural gas reformer to be captured and reutilized in the reforming process, thus achieving excellent energy efficiency; and an apparatus for producing a reducing gas for the process.

An aspect of the present invention provides an apparatus for producing a reducing gas for direct reduction iron-making, the apparatus including: an internal-heating type reformer for reforming a natural gas by adding steam and oxygen to the natural gas and by partially burning the natural gas to generate a reducing gas containing hydrogen and carbon monoxide for direct reduction iron-making; a carbon dioxide remover for removing carbon dioxide from exhaust gas generated in the direct reduction iron-making; and an exhaust-gas recycling line for recycling as the reducing gas the exhaust gas from which the carbon dioxide is removed by the remover.

Another aspect of the present invention provides a method for producing direct reduced iron from a raw material containing iron oxide, the method including the steps of: reforming a natural gas by adding steam and oxygen to the natural gas and by partially burning the natural gas to generate a reducing gas containing hydrogen and carbon monoxide; reducing the raw material containing iron oxide by using the reducing gas to produce the direct reduced iron; removing carbon dioxide from exhaust gas generated in the reducing step; and recycling as the reducing gas the exhaust gas from which the carbon dioxide is removed in the removing step.

According to the present invention, a portion of the natural gas is burned by adding at least oxygen thereto, and another portion of the natural gas is reformed by utilizing the heat of the burning. This makes it possible to decrease an amount of waste heat to be generated in the reformer. Thus, the waste heat generated in the reformer can be fully captured and reutilized in the reforming process. Therefore, a great improvement is achieved in energy efficiency required in production of reducing gas in the direct reduction iron-making process.

DESCRIPTION OF THE PREFERRED EMBODIMENTS

Figure 1:
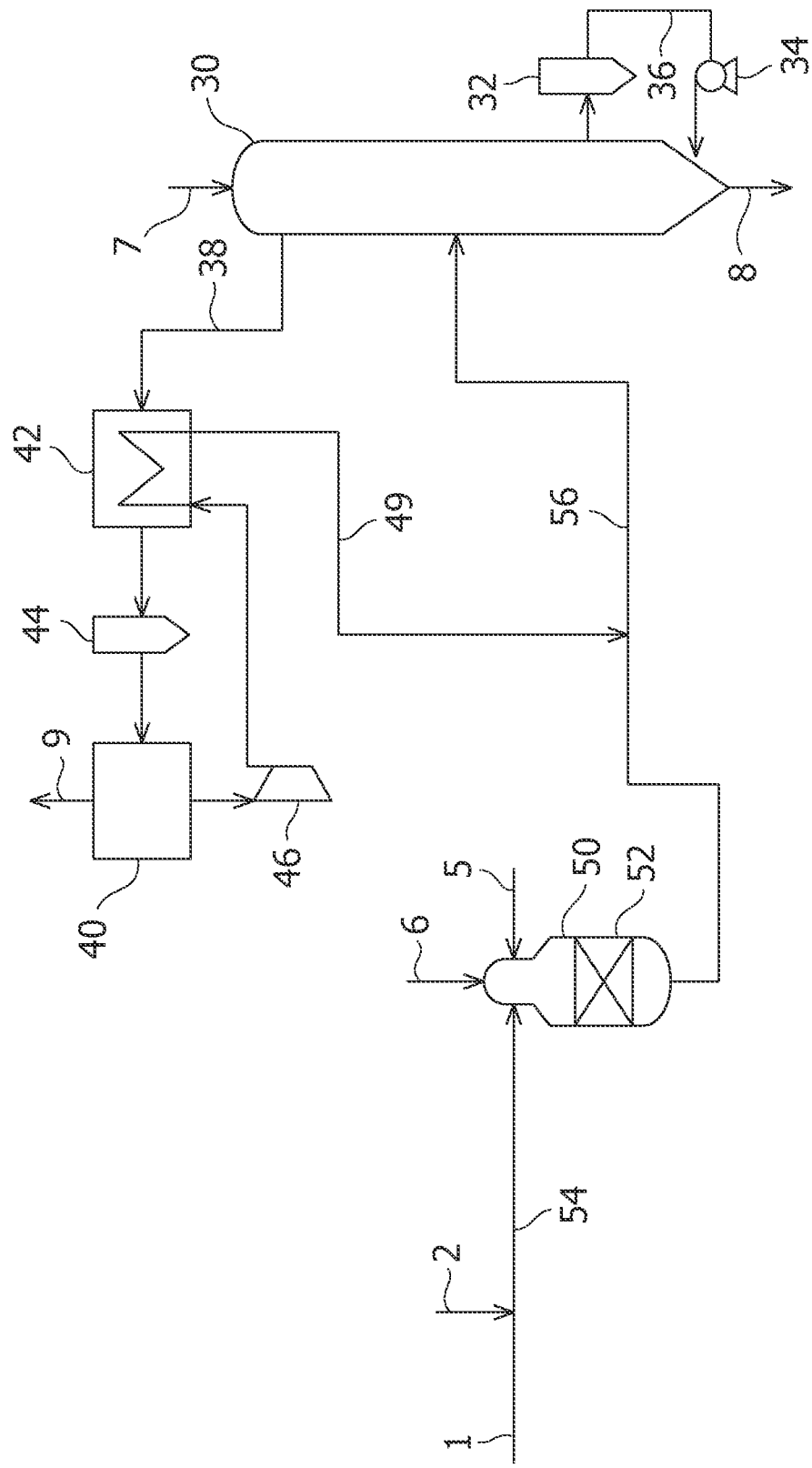
FIG. 1 is a schematic view showing one embodiment of a direct reduction iron-making method according to the present invention.

Hereinafter, description will be given of embodiments of a direct reduction iron-making method according to the present invention and a reducing gas producing apparatus therefor with reference to the accompanying drawings. However, the invention is not to be considered limited to what is shown in the drawings and described in the specification.

FIG. 1 shows an embodiment of a direct reduction iron-making system for carrying out a direct reduction iron-making method according to the present invention. This system basically includes an apparatus for producing a reducing gas and a reduction furnace for a raw material containing iron oxide. As shown in FIG. 1, the reducing gas producing apparatus mainly includes a single reformer 50. The reduction furnace mainly includes a shaft furnace 30 for reducing a raw material containing iron oxide with reducing gas.

The reformer 50 is of an internal-heating type, and includes a catalyst layer 52 through which a natural gas 1 flows. The natural gas 1 is a raw material of the reducing gas. The catalyst layer 52 is filled with an autothermal reforming catalyst for an autothermal reforming reaction to take place. The term "autothermal reforming" means an approach in which both an endothermic reaction of reformation with steam and an exothermic reaction of partial oxidation proceed in a reaction chamber to reform a natural gas with well-balanced heat. As the autothermal reforming catalyst, a wide variety of known catalysts can be used. For example, it is possible to use catalysts having an active metal of Groups 8 to 10 metals such as nickel, cobalt, iron, ruthenium, rhodium, iridium, and platinum. These catalysts are preferably ones in which an active metal is supported on a support such as alumina.

The reformer 50 includes a raw-material supply line 54 for supplying the reformer 50 with a raw-material natural gas and supply lines for supplying the reformer 50 with steam 5 and oxygen 6 respectively. Moreover, the reformer 50 includes a reducing gas supply line 56 for supplying the shaft furnace 30 with a reducing gas obtained by reforming a natural gas through the autothermal reforming.

The shaft furnace 30 is generally used as a reduction furnace for direct reduction iron-making. The shaft furnace 30 includes a hopper (not shown) at the furnace top for supplying a raw material for direct reduction iron-making, reducing gas blowing means (not shown) at an intermediate portion in the furnace, and a cooling unit (not shown) at a lower portion in the furnace for cooling iron reduced with the reducing gas. The shaft furnace 30 includes means for recycling a cooling gas drawn out from the cooling unit. Specifically, the shaft furnace 30 includes, as shown in FIG. 1, a cooling-gas circulation line 36 for introducing a cooling gas drawn out from an upper portion of the cooling unit into a lower portion of the cooling unit. The cooling-gas circulation line 36 is provided with a cooling gas cleaner 32 for cleaning the cooling gas, and a cooling gas compressor 34 for compressing the cleaned cooling gas.

In this embodiment, the reducing gas producing apparatus includes a facility for recycling exhaust gas generated in the shaft furnace 30 as a reducing gas. This exhaust-gas recycling facility includes, as shown in FIG. 1, a $CO_2$ remover 40 which removes carbon dioxide from exhaust gas for recycling. As the $CO_2$ remover 40, for example, a $CO_2$ remover using an amine-based absorbing solution according to the chemical absorption process can be employed.

The exhaust-gas recycling facility also includes an exhaust-gas collecting line 38 for supplying the $CO_2$ remover 40 with exhaust gas drawn out from the furnace top of the shaft furnace 30, and an exhaust-gas recycling line 49 for supplying the shaft furnace 30 with the exhaust gas from which carbon dioxide is removed (may also be referred to as "recycle gas"), and which serves as a reducing gas. The exhaust-gas collecting line 38 is provided with a heat exchanger 42 for the exhaust-gas recycling line 49 and an exhaust gas cleaner 44 for removing dust and water contained in the exhaust gas in the sequence along the flow of the exhaust gas. The exhaust-gas recycling line 49 is provided with a recycle gas compressor 46 for compressing the recycle gas, and the heat exchanger 42 for the exhaust-gas collecting line 38 in the sequence along the flow of the recycle gas.

In the above configuration, the catalyst layer 52 of the reformer 50 is supplied with the natural gas 1 through the raw-material supply line 54 and with the steam 5 and the oxygen 6 through the respective supply lines. In the reformer 50, first, part of the natural gas undergoes a partial oxidation reaction. The partial oxidation reaction is an exothermic reaction. Utilizing heat obtained therefrom, and subsequently utilizing a reforming reaction with the steam, which is an endothermic reaction, a reforming reaction takes place in the catalyst layer 52. In this manner, the partial oxidation and the reformation with the steam are allowed to proceed in the single reformer 50 with the well-balanced heat. Thereby, methane, which is the main component of the natural gas, is converted into hydrogen and carbon monoxide.

Hence, a reducing gas containing the hydrogen and carbon monoxide can be obtained from the catalyst layer 52 of the reformer 50 without supply of any fuel in particular. The temperature of the reducing gas is 900° C. to 1100° C., preferably 950° C. to 1050° C. Additionally, the reducing gas is controlled in such a manner that the pressure thereof is 4 to 5 $kg/cm^2G$. Incidentally, depending on the pressure in the process operation, the pressure of the reducing gas may be very high. In such a case, an expander may be provided at the outlet of the reformer 50 in order to lower the pressure of the reducing gas to 4 to 5 $kg/cm^2G$ and to collect the driving power.

The reducing gas supply line 56 supplies the reducing gas to the intermediate portion of the shaft furnace 30, and iron ore 7 is reduced to iron with the reducing gas while the solid phase is being retained. The shaft furnace 30 is controlled, so that the pressure inside is approximately 3 $kg/cm^2G$. The exhaust gas generated in the shaft furnace 30 contains: carbon dioxide and steam generated by the direct reduction of the iron oxide; a non-reacted component of the reducing gas in the shaft furnace 30, that is, hydrogen and carbon monoxide; and a component of the natural gas not reformed in the reformer 50, mainly methane. The exhaust gas is discharged from the furnace top through the exhaust-gas collecting line 38, and cooled with the heat exchanger 42. After the water content thus condensed is removed with the exhaust gas cleaner 44, the exhaust gas is supplied to the $CO_2$ remover 40. Note that the pressure of the exhaust gas is lowered to approximately 2.5 $kg/cm^2G$ at the outlet of the exhaust gas cleaner 44.

In the $CO_2$ remover 40, carbon dioxide contained in the exhaust gas is removed. The carbon dioxide 9 is released into the air, or effectively utilized. Thereby, a recyclable recycle gas can be obtained from the $CO_2$ remover 40 as a reducing gas containing high-concentration hydrogen and carbon monoxide. The recycle gas from which carbon dioxide is removed is allowed to flow through the exhaust-gas recycling line 49, and the pressure is increased to 4 to 5 $kg/cm^2G$ with the recycle gas compressor 46. Subsequently, the temperature is increased to 400° C. to 700° C. with the heat exchanger 42 for the exhaust gas from the shaft furnace. Then, the recycle gas is supplied to the shaft furnace 30 again as a reducing gas.

In this manner, in the single reformer 50, the autothermal reforming reaction proceeds, that is, a reforming reaction proceeds with the well-balanced heat in the exothermic reaction of the partial oxidation reaction and the endothermic reaction of the reforming reaction with the steam. Accordingly, the amount of fuel supplied to the reformer can be greatly reduced. In addition, the amount of waste heat thus generated in the reformer 50 can also be greatly reduced. Thus, a great improvement is achieved in energy efficiency required in production of a reducing gas for direct reduction iron-making. Moreover, to recycle the exhaust gas from the shaft furnace as the reducing gas, the exhaust gas needs to be reformed again. However, removing carbon dioxide in the exhaust gas with the $CO_2$ remover 40 enables recycling as the reducing gas by simple heating.

EXAMPLES

The simulation was carried out using the direct reduction iron-making system shown in FIG. 1 on the energy required in production of a reducing gas for producing one million tons of direct reduced iron annually.

In the system shown in FIG. 1 (Example), $278.0 \times 10^6$ kcal of a natural gas was used per hour as the raw material, and 16,630 $Nm^3$ of oxygen was used in the reformer per hour. Thereby, a reducing gas containing CO and $H_2$ and having a pressure of 4 to 5 $kg/cm^2G$ and a temperature of 1000° C. was obtained by 83,700 $Nm^3$ per hour. Thus, production of one million tons of direct reduced iron a year can be achieved.

Figure 2:
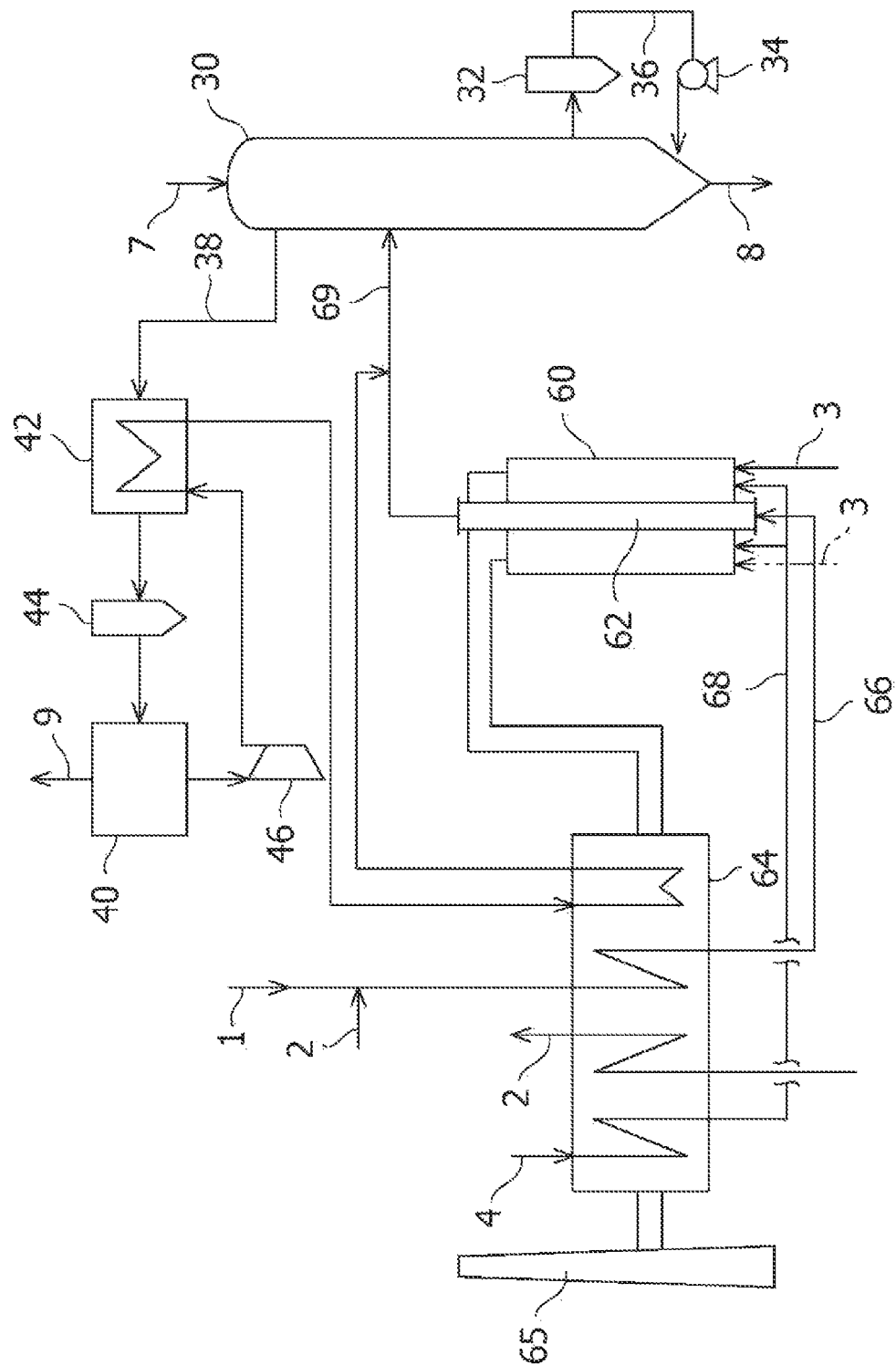
FIG. 2 is a schematic view showing a direct reduction iron-making method of the Comparative Example.

In addition, the simulation as Comparative Example was similarly carried out using a direct reduction iron-making system shown in FIG. 2. As shown in FIG. 2, the system of Comparative Example is provided with a single external-heating type reformer 60. A catalyst layer 62 of the reformer 60 is filled with a steam reforming catalyst. The catalyst layer 62 is supplied through a supply line 66 with a natural gas 1 and steam 2 preheated with a heat exchanger 64 for burner exhaust gas of the reformer 60. The reformer 60 is supplied with a natural gas 3 as a burner fuel. In addition, the reformer 60 is supplied through a supply line 68 with burner burning air 4 preheated with the heat exchanger 64. A reducing gas reformed with the reformer 60 is supplied to a shaft furnace

30 through a reducing gas supply line 69. After a CO$_2$ remover 40 removes carbon dioxide from exhaust gas generated in the shaft furnace 30, the exhaust gas is heated with a heat exchanger 42 for the exhaust gas from the shaft furnace and the heat exchanger 64 for the burner exhaust gas of the reformer 60. Then, the exhaust gas is supplied as a reducing gas to the shaft furnace 30 again.

In the system of the Comparative Example shown in FIG. 2, 224.9×10$^6$ kcal of a natural gas was used per hour as the raw material, and 114.8×10$^6$ kcal of a natural gas was used per hour as the fuel in the reformer. Thereby, a reducing gas containing CO and H$_2$ and having a pressure of 4 to 5 kg/cm$^2$G and a temperature of 1000° C. was obtained by 83,700 Nm$^3$ per hour. Thus, production of one million tons of direct reduced iron a year can be achieved.

The energy efficiency in Example was evaluated based on that in the Comparative Example. In the Example, 278.0×10$^6$ kcal of a natural gas per hour is required in total including the raw material and the fuel. In contrast, in the Comparative Example, 339.7×10$^6$ kcal of a natural gas per hour is required in total including the raw material and the fuel. Hence, in the Example, the energy can be reduced by 18.16% in comparison with the Comparative Example.

EXPLANATION OF REFERENCE NUMERALS

1, 3 natural gas
2, 5 steam
4 air
6 oxygen
7 iron ore
8 direct reduced iron
9 carbon dioxide
30 shaft furnace
32 cooling gas cleaner
34 cooling gas compressor
36 cooling-gas circulation line
38 exhaust-gas collecting line
40 CO$_2$ remover
42 heat exchanger
44 exhaust gas cleaner
46 recycle gas compressor
48, 49 exhaust-gas recycling line
50 reformer
52 catalyst layer
54 raw-material supply line
56 reducing-gas supply line
60 reformer
62 catalyst layer
64 heat exchanger
65 chimney
66 raw-material supply line
68 air supply line
69 reducing-gas supply line

What is claimed is:

1. An apparatus of producing a reducing gas to be supplied to a direct reduction iron-making furnace, comprising:
    an internal-heating reformer for reforming a natural gas by adding steam and oxygen to the natural gas to supply a mixture of the natural gas, the steam and the oxygen to a catalyst bed in the reformer and by proceeding both an endothermic reaction of a reformation with steam and an exothermic reaction of partial oxidation in the catalyst bed to generate a reducing gas containing hydrogen and carbon monoxide and having a temperature range between 900 and 1,100° C.;
    a carbon dioxide remover for removing carbon dioxide from exhaust gas discharged in the direct reduction iron-making furnace;
    an exhaust-gas recycling line for recycling as the reducing gas the exhaust gas from which the carbon dioxide is removed by the remover;
    a heat exchanger for increasing a temperature of the carbon dioxide-removed gas to a range between 400 and 700° C. with the exhaust gas discharged in the direct reduction iron-making furnace before recycling the carbon dioxide-removed gas as the reducing gas for the direct reduction iron-making furnace; and
    a line for supplying the exhaust gas discharged from the direct reduction iron-making furnace to the heat exchanger before supplying it to the carbon dioxide remover.

2. A method for producing direct reduced iron from a raw material containing iron oxide, comprising the steps of:
    reforming a natural gas by supplying the natural gas, steam and oxygen to a catalyst bed in a reformer and by proceeding both an endothermic reaction of a reformation with steam and an exothermic reaction of partial oxidation in the catalyst bed to generate a reducing gas containing hydrogen and carbon monoxide and having a temperature range between 900 and 1,100° C.;
    reducing the raw material containing iron oxide in a direct reduction iron-making furnace by using the reducing gas to produce the direct reduced iron;
    removing carbon dioxide from exhaust gas discharged from the direct reduction iron-making furnace in the reducing step;
    increasing a temperature of the carbon dioxide-removed gas obtained in the removing step to a range between 400 and 700° C. in a heat exchanger;
    supplying the exhaust gas discharged from the direct reduction iron-making furnace in the reducing step to the heat exchanger for the increasing step, before subjecting it to the removing step; and
    supplying the temperature-increased gas obtained in the increasing step with the reducing gas obtained in the reforming step to the direct reduction iron-making furnace for the reducing step.

* * * * *